United States Patent
Palmer (10) Patent No.: US 8,897,952 B1
(45) Date of Patent: Nov. 25, 2014

(54) VEHICLE DIAGNOSTIC COMMUNICATIONS SYSTEM AND APPLICATION

(71) Applicant: Brian Palmer, Orem, UT (US)

(72) Inventor: Brian Palmer, Orem, UT (US)

( * ) Notice: Subject to any disclaimer, the term of this patent is extended or adjusted under 35 U.S.C. 154(b) by 0 days.

(21) Appl. No.: 14/013,940

(22) Filed: Aug. 29, 2013

Related U.S. Application Data (63) Continuation-in-part of application No. 13/112,402, filed on May 20, 2011, now Pat. No. 8,532,866.

(51) Int. Cl.
 *G06F 7/00* (2006.01)
 *G07C 5/00* (2006.01)

(52) U.S. Cl.
 CPC ..................................... *G07C 5/008* (2013.01)
 USPC ............................ 701/31.5; 701/29.1; 701/33

(58) Field of Classification Search
 CPC .... G07C 5/008; G07C 5/0808; G07C 5/0816; G07C 5/085; G06F 11/2294
 USPC ......................... 701/29.1, 33, 35; 714/25, 699
 See application file for complete search history.

(56) References Cited

U.S. PATENT DOCUMENTS

| | | | |
|---|---|---|---|
| 5,796,401 A | 8/1998 | Winer | |
| 6,711,474 B1* | 3/2004 | Treyz et al. | 701/1 |
| 6,795,760 B2 | 9/2004 | Fuller | |
| 7,116,216 B2 | 10/2006 | Andreasen | |
| 7,786,851 B2 | 8/2010 | Drew | |
| 7,853,375 B2 | 12/2010 | Tuff | |
| 7,920,102 B2 | 4/2011 | Breed | |
| 7,928,837 B2 | 4/2011 | Drew | |
| 8,180,522 B2 | 5/2012 | Tuff | |
| 8,527,135 B2* | 9/2013 | Lowrey et al. | 701/29.1 |
| 2003/0058280 A1 | 3/2003 | Molinari | |
| 2004/0221124 A1* | 11/2004 | Beckert et al. | 711/202 |
| 2005/0065678 A1* | 3/2005 | Smith et al. | 701/29 |
| 2006/0277498 A1 | 12/2006 | Mann | |
| 2006/0277499 A1 | 12/2006 | Britt | |
| 2007/0083303 A1* | 4/2007 | O'Sullivan et al. | 701/29 |
| 2008/0015748 A1* | 1/2008 | Nagy | 701/33 |
| 2008/0082221 A1* | 4/2008 | Nagy | 701/2 |
| 2008/0126358 A1 | 5/2008 | Turner | |
| 2008/0137860 A1 | 6/2008 | Silvernail | |
| 2008/0140281 A1 | 6/2008 | Morris | |
| 2008/0147268 A1 | 6/2008 | Fuller | |

(Continued)

FOREIGN PATENT DOCUMENTS

EP 1513288 9/2005

OTHER PUBLICATIONS

Palmer, Brian, Image of web page for PCMScan software product, abt. 2005.
Palmer, Brian, User Manual for PCMScan Software, abt. 2005.

(Continued)

*Primary Examiner* — Mary Cheung
*Assistant Examiner* — Rodney Butler
(74) *Attorney, Agent, or Firm* — ColterJennings (57) ABSTRACT

A system for web-enabled vehicle diagnostic communications that includes a transceiver having a web server supporting WebSockets and is connected to a vehicle data port. The transceiver accepts web connections from various computing devices. The transceiver receives URIs from computing devices over the web connection and checks to determine if they are diagnostic URIs, in which case the web connection is converted into a diagnostic WebSocket capable of bidirectional vehicle communications. A web application may be used to operate the system.

20 Claims, 4 Drawing Sheets

(56) References Cited

U.S. PATENT DOCUMENTS

| | | | |
|---|---|---|---|
| 2008/0231712 A1* | 9/2008 | Frink et al. | 348/207.1 |
| 2009/0184812 A1 | 7/2009 | Drew | |
| 2009/0273438 A1* | 11/2009 | Sultan et al. | 340/5.7 |
| 2010/0161169 A1* | 6/2010 | Ramanathan et al. | 701/33 |
| 2010/0191801 A1* | 7/2010 | Sodergren | 709/203 |
| 2010/0199080 A1* | 8/2010 | Kolb | 713/2 |
| 2011/0035461 A1* | 2/2011 | Sodergren et al. | 709/213 |
| 2011/0258044 A1 | 10/2011 | Kargupta | |
| 2011/0313593 A1 | 12/2011 | Cohen | |
| 2012/0106342 A1 | 5/2012 | Sundararajan | |
| 2012/0194679 A1* | 8/2012 | Nehowig et al. | 348/148 |
| 2012/0213205 A1* | 8/2012 | Tammisetti | 370/332 |
| 2012/0259951 A1* | 10/2012 | Schalk et al. | 709/217 |
| 2014/0066103 A1* | 3/2014 | Das et al. | 455/456.3 |

OTHER PUBLICATIONS

BMW N54 N55 135 335 535 Turbo Performance Forum (BMW_JB4_N54tech.pdf), 2009.

CAN Tool Guide for 2008+ BMW 135/335/535/X5 (BMW_CAN_tool.pdf), Apr. 2, 2011.

ISO 15765-4 Jan. 2005 (ISO_15765-4_2005.pdf).

ISO 9141 AN602 by John Bendel Apr. 1996 (iso9141_an602.pdf).

ISO 9141-2 Feb. 1994 (ISO9141-2_1994.pdf).

ISO/DIS 13400-1 Sep. 2010/Feb. 2011 (ISO_DIS_13400-1.pdf).

ISO/DIS 13400-2 Sep. 2010/Feb. 2011 (ISO_DIS_13400-2.pdf).

ISO/Dis 13400-3 Sep. 2010/Feb. 2011 (ISO_DIS_13400-3.pdf).

Juice Box Stage 4 PnP—135/335/535 Installation Guide—Jun. 20, 2012 (JB4PnP.pdf).

KWP 2000/14230-1 Oct. 1997 (14230-1s.pdf).

KWP 2000/14230-2 Apr. 1997 (14230-2s.pdf).

KWP 2000114230-3 Feb. 2000 (14230-3s.pdf).

SAE J1850 Jun. 2006 (saej1850v004.pdf).

SAE J1962 Apr. 2002 (saej1962v003.pdf).

SAE J1978 Apr. 2002 (saej1978v003.pdf).

SAE J1979 May 2007 (saej1979v003.pdf).

SAE J2178-1 Jul. 2004 (saej2178-1v003.pdf).

SAE J2178-2 Jul. 2004 (saej2178-2v003.pdf).

SAE J2178-3 Jul. 2004 (saej2178-3v004.pdf).

SAE J2178-4 Jul. 2004 (saej2178-4v003.pdf).

SAE J2190 Jun. 1993 (saej2190v001.pdf).

SAE J2534-1Dec. 2004 (saej2534-1v002.pdf).

SAE J2534-2 Mar. 2006 (saej2534-2v001.pdf).

ELM327 OBD to RS232 Interpreter (copyright 2005-2010) (ELM327DSH.pdf).

Commands for Host-Processed and Host Controlled Modems, Conexant, Apr. 5, 2001 (Hayes_command_reference.pdf.

Hypertext Transfer Protocol—HTTP/1.1, Network Working Group, 1999 (rfc2616.pdf).

STN1100 Family Reference and Programming Manual, OBD Solutions, probable date of Oct. 28, 2009 (stn1100_frpm.pdf).

The WebSocket Protocol, Internet Engineering Task Force, Dec. 2011 (rfc6455.pdf).

\* cited by examiner

VEHICLE DIAGNOSTIC COMMUNICATIONS SYSTEM AND APPLICATION

PRIORITY CLAIM

This application claims the benefit of the filing date of U.S. patent application Ser. No. 13/112,402, filed May 20, 2011, for "Concurrent Vehicle Data Port Communication System," the disclosure of which is hereby incorporated herein in its entirety by this reference. This application relates generally to the subject matter of U.S. patent application Ser. No. 12/271,633 filed Nov. 14, 2008 for "Method of Rendering Dynamic Vehicle Telemetry on a Graphical Display"; Ser. No. 13/658,464 filed Oct. 23, 2012 for "Driver Information and Alerting System"; and Ser. No. 13/860,428 filed Apr. 10, 2013 for "System for Advertising Vehicle Information Wirelessly"; the disclosures of each of which are incorporated herein by this reference.

BACKGROUND

This application relates generally to a method for communication of dynamic vehicle diagnostic and telemetry data between a web-enabled transceiver connected to a vehicle data port and one or more computing devices, such as a desktop or laptop computer, network server, or hand-held device (which could be a smartphone, tablet, or some other device), and in particular to a method of providing motor vehicle data to one or more users using a heterogeneous group of user devices, while allowing each user to customize the data displayed on the user's device.

Since 1996, every passenger car and light-duty truck sold in the United States has had a computer diagnostic port, called an OBD-II port or an SAE-J1962 port. Most heavy-duty trucks currently sold in the United States also include a computer diagnostic port, usually referred to as a J1708 port or a J1939 port. This diagnostic port permits a mechanic or other user to connect to the vehicle and retrieve vehicle telemetry, that is, data about the vehicle, including engine, fuel system, brake system, and other data. Software has been developed to permit mechanics and automobile enthusiasts to develop graphical programs for displaying the diagnostic and telemetry data on a computer display.

Traditionally, vehicle data ports and diagnostic systems have been designed to permit a single external device (or "scan tool") to connect to a vehicle at any one time. If a dashboard display device is already connected to the vehicle data port and a user wanted to plug in a separate scan tool, the user either had to unplug the dashboard display device, or somehow split the wires so that a second device can be connected. In fact, many companies currently sell vehicle data port splitters (or "Y-cables").

In most cases, these types of arrangements are constructed so that multiple devices are physically connected to (or in electrical communication with) the vehicle data port, but typically only one device is actively communicating with the vehicle at any given time, while one or more other devices are in a monitor-only mode, without active bidirectional communication directly with the vehicle. This way, the vehicle maintains bidirectional communication with only a single device at a time. Often, that connected device has no knowledge that other external devices are also monitoring communications from the vehicle.

Using a splitter or "Y-cable" with more than one device concurrently communicating with vehicles today causes a number of problems. It is widely assumed that only one device will be communicating with the vehicle at once, and some vehicles even enforce this by only responding to data requests from a single address. In fact, newer vehicle data protocols have standardized on this practice by assigning external test equipment only a single allowable address range. If more than one device concurrently communicates with the vehicle, these protocols cause addressing conflicts, data collisions, timing violations and other kinds of related data acquisition problems.

In the past, multiple connected device usage has been mostly limited to the scan tool designers who occasionally want to connect a second device using a "Y-cable" to monitor the requests they transmit to verify conformance or to monitor and debug the scan tool communications. However, contrary to much of the prevailing wisdom in this area, the ability to have concurrent users all communicating with the same vehicle has definite advantages. Thus, development of such a system while staying compliant with existing vehicle protocols, which were typically not designed with multiple concurrent connections in mind, could be very useful.

Vehicle diagnostic scan tool hardware interfaces, or data port transceivers, typically utilize one or more of various communications protocols and/or connectivity systems such as USB, RS232, Ethernet, WiFi (Infrastructure, Adhoc, etc.), Bluetooth and others. Usually the communications protocol used depends upon the target computing device platform. For example, some computing device platforms may support WiFi but not USB, Bluetooth, or any others. Other computing device platforms may support Infrastructure WiFi and specific kinds of Bluetooth, but not Adhoc WiFi or any others. Because of this, the vehicle diagnostic hardware interface is usually sold as being compatible with specific computing device platforms, with various models available for various supported computing device platforms.

There are many computing device platforms currently in existence, such as Windows, Linux, Mac OS, iOS, Android, Blackberry, PalmOS, WebOS, Windows CE, Windows Phone, Symbian, QNX, Chrome OS, Tizen, Firefox OS, and many more. Developing a diagnostic scan tool software application (or "app") separately for each computing device platform would be costly and time consuming. Most computing device platforms available today, especially for mobile computing devices, support WiFi and include a web browser application as well as embedded web clients and other web client support. Thus, development of a fully web-based diagnostic system that is compatible with a plurality of computing device platforms may be very useful.

SUMMARY

The present apparatus, system, and method allows for communication and acquisition of dynamic vehicle diagnostic and telemetry data by one or more computing devices, such as computer monitors, hand-held devices, data logging and storage systems, external vehicle test equipment, scan tools, code readers, or other devices. The system communicates with the vehicle through the existing vehicle data port, such as the OBD-II port. One or more independent user computing devices are able to connect to a web-enabled transceiver and send and receive communication from the transceiver, and also may request data from the vehicle or send and receive other types of vehicle communications. The specific requested data may be unique to the computing device or may overlap with the set of data requested by other computing devices, and is provided to the requesting computing device.

The system includes a web-enabled transceiver in electrical communication with the vehicle data port (either directly connected or indirectly using a pass-thru interface box or other means of wired or wireless electrical communication). The transceiver communicates with the vehicle through the vehicle data port. The transceiver, being web-enabled, includes a web protocol stack and web (or HTTP/HTTPS) server and also communicates with each of the computing devices. As data or other communications becomes available from the vehicle, the transceiver pulls that data off the vehicle data port and provides it to any of the computing devices whose users may have requested such data. In some embodiments, the system even permits computing devices to provide commands through the communications path to the vehicle. The data is provided to the computing device and may be displayed on the computing device's own display device, logged by the computing device, or used in other ways. Each user of a computing device may or may not be aware that multiple users may be concurrently communicating with the vehicle.

In some embodiments, the web-enabled transceiver may host the entire diagnostic scan tool software application on its own built-in data storage medium accessible through its web server, which allows the computing devices to simply connect to the transceiver web server and download the diagnostic scan tool app as part of a web page. This scenario allows for standalone vehicle diagnostics between the transceiver and the computing device without requiring any external servers or software app delivery systems. In other embodiments, the diagnostic scan tool app is hosted on a server separate from and external to the transceiver (such as a web page hosted on an external Internet server or other network server) or is delivered to the computing device via a software app delivery system (or "app store"). In many embodiments, the diagnostic scan tool app may support simultaneous connections to multiple web-enabled transceivers installed within or in electrical communication with one or more separate vehicles.

In one embodiment, the web-enabled transceiver accepts diagnostic connections using WebSockets. In this embodiment, the diagnostic scan tool software application (or "diagnostic web app" or simply "web app") may run entirely as an HTML and Javascript web page. The web app may then open WebSocket connections to one or more web-enabled transceivers using various predetermined uniform resource identifiers ("URIs") or uniform resource locators ("URLs") and communicate diagnostic data using Text or Binary frame data types.

BRIEF DESCRIPTION OF THE DRAWINGS

Other features and advantages of the present method will be apparent from the following Detailed Description taken in conjunction with the accompanying Drawings, in which.

DETAILED DESCRIPTION

Modern vehicles typically have a data port, such as an On-Board Diagnostics II port ("OBD-II port"). In prior systems, a single device connected to the vehicle data port permitted a single user to communicate with the vehicle through the data port. According to the present disclosure, a system and apparatus is provided that permits several users concurrently to communicate with a single vehicle data port.

Figure 3:
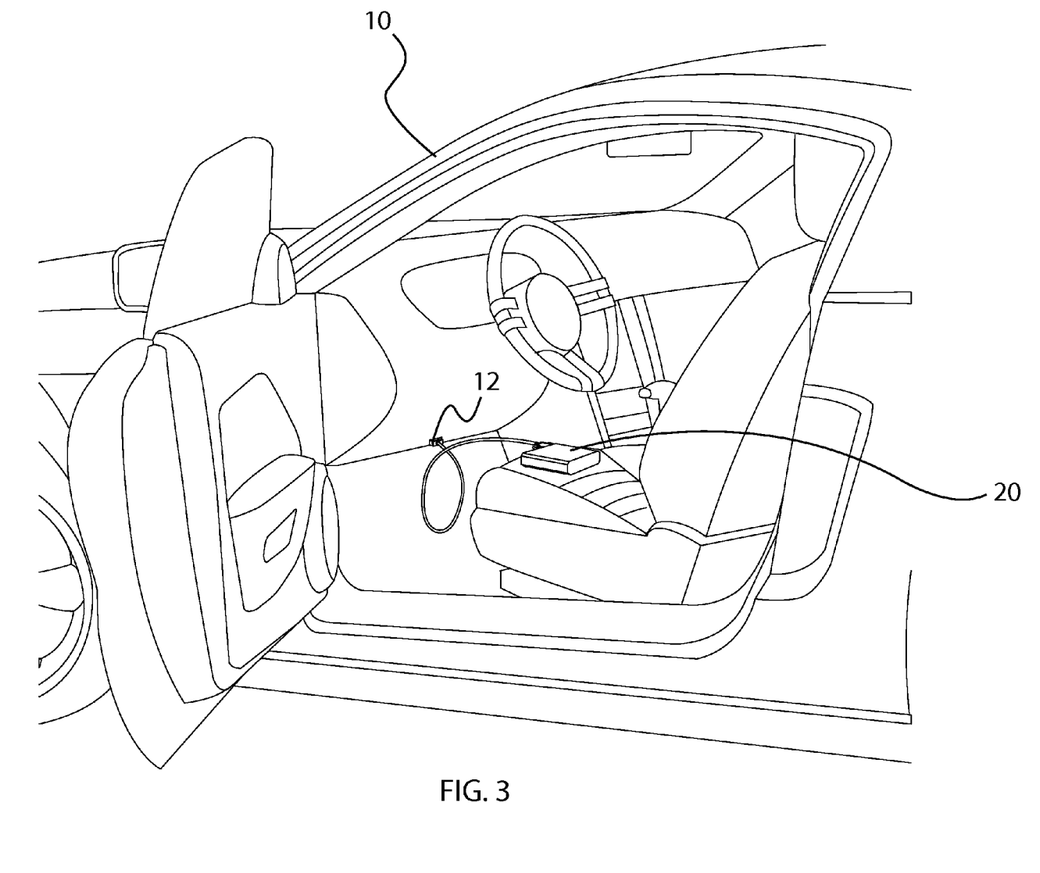
FIG. 3 depicts a transceiver directly connected to the vehicle port.
Figure 4:
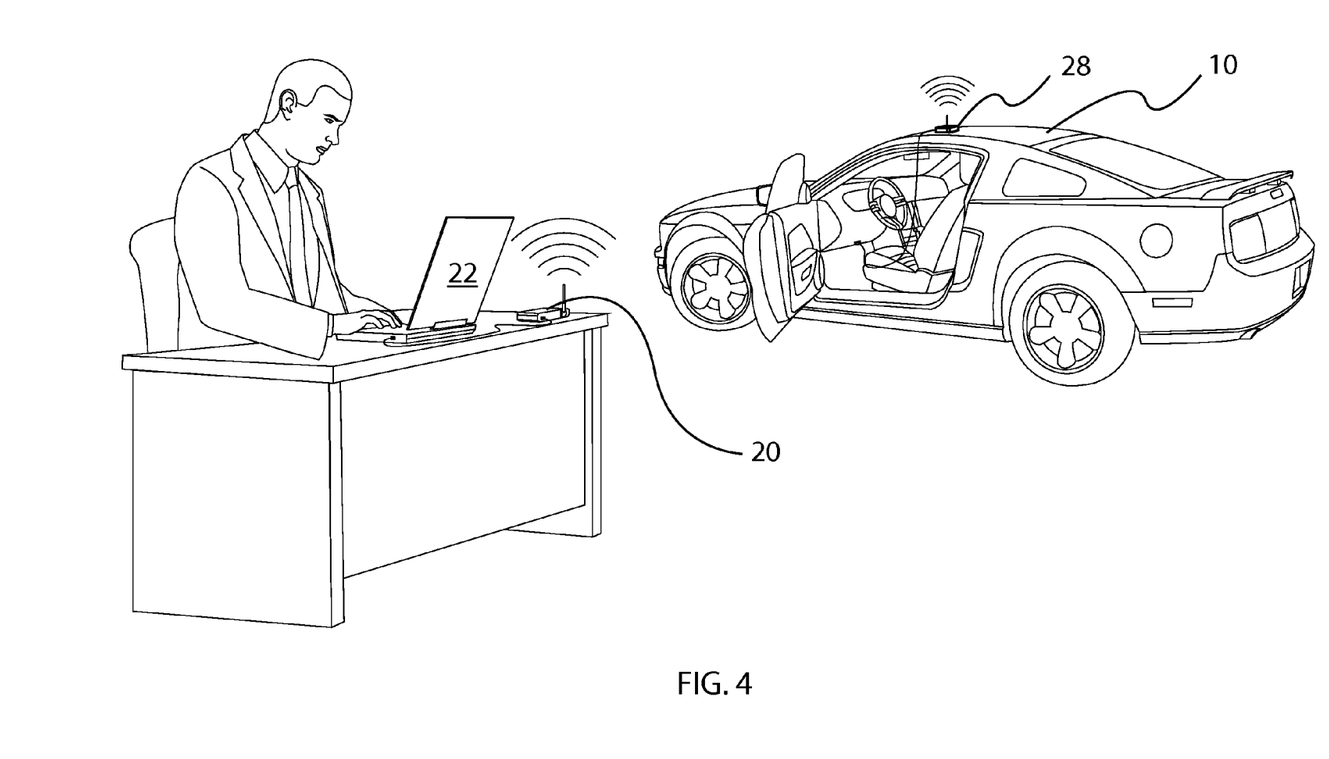
FIG. 4 depicts a transceiver communicating with a vehicle using a wireless pass thru hardware interface box, so that the vehicle may be physically located in a remote location.

As depicted in FIGURES, a vehicle 10 includes at least one vehicle data port 12, which is typically an OBD-II port but may be other data ports. In the embodiment depicted in FIG. 2, a pass-thru interface 14 connects to the data port 12 through a cable 16, and a second cable 18 connects the pass-thru interface 14 to an intelligent data transceiver 20. In the embodiment depicted in FIG. 3, the transceiver 20 is directly connected to the data port 12. In the embodiment depicted in FIG. 1, the transceiver 20 is directly connected to the data port 12, and an independent user computing device 22 is connected to the transceiver 20 using a communications cable 24. In the embodiment depicted in FIG. 4, a wireless pass-thru interface 28 is connected to the transceiver 20, and a user computing device 22 is connected to the transceiver 20.

Figure 1:
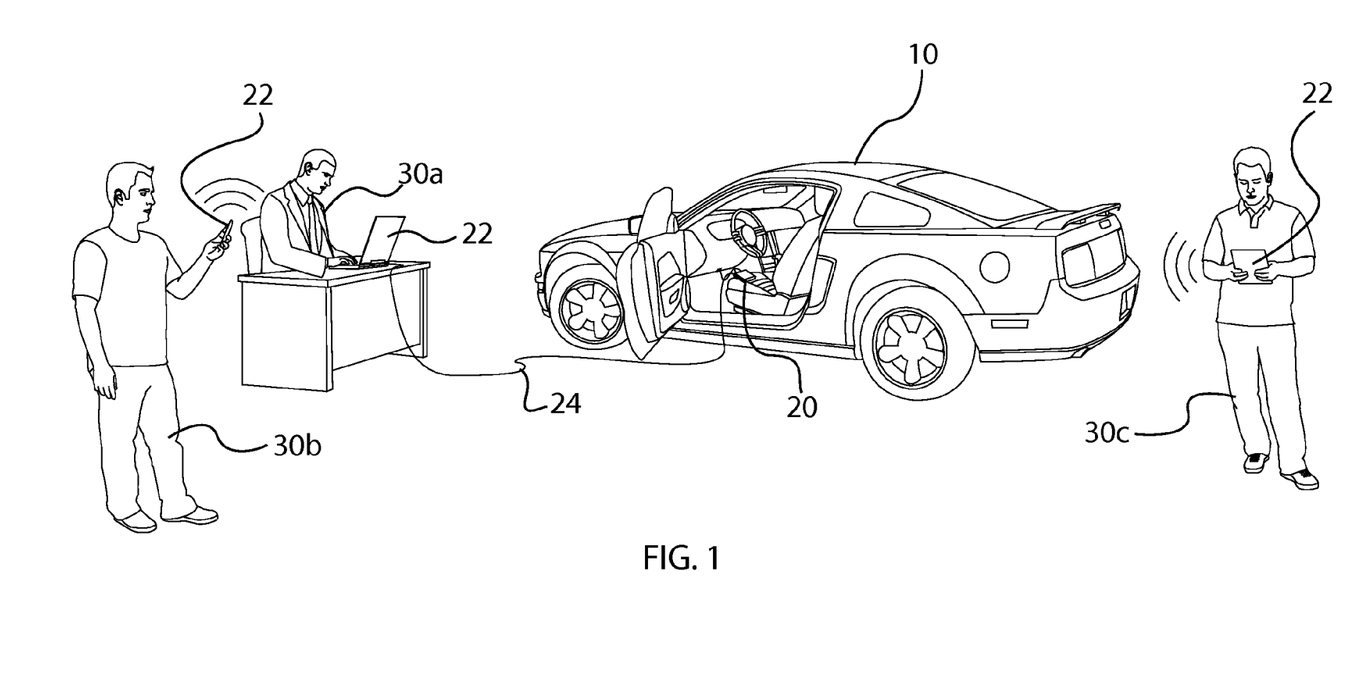
FIG. 1 depicts a perspective view of several users concurrently communicating with a single vehicle data port using a variety of display devices and both wired and wireless communications.
Figure 2:
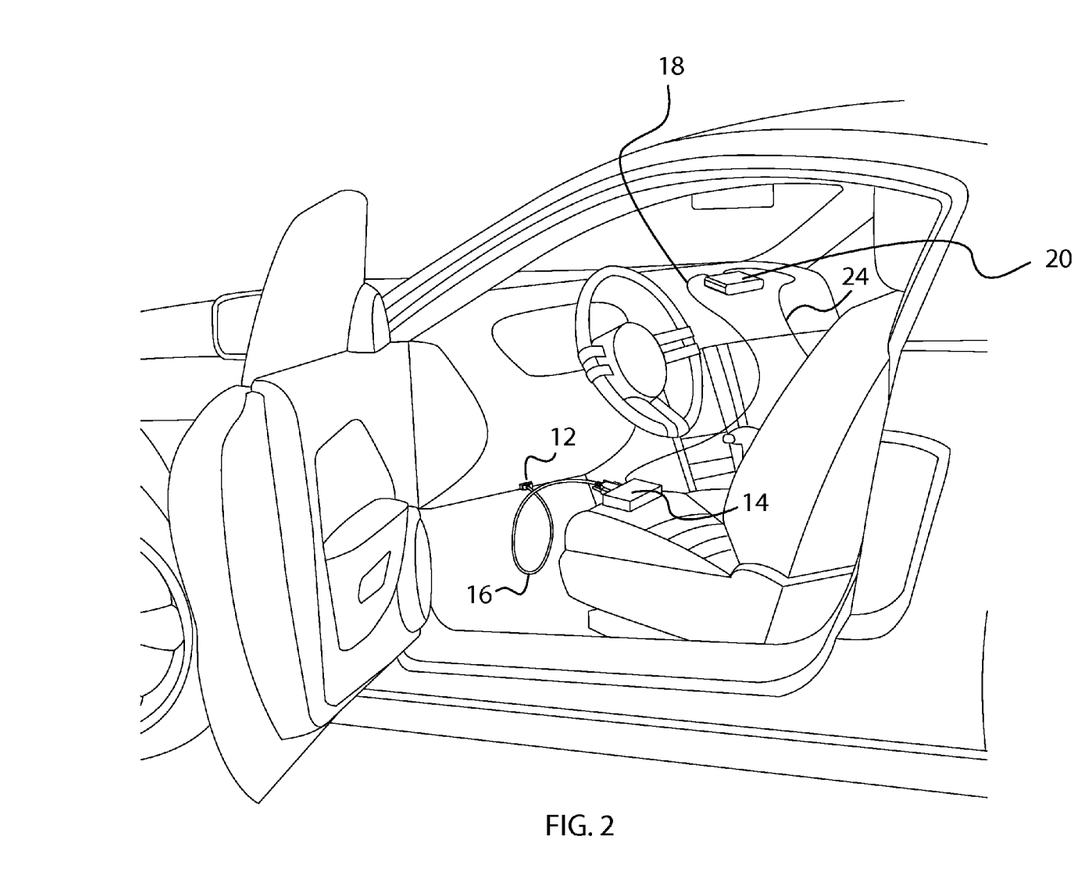
FIG. 2 depicts a partial perspective view of the interior of a vehicle showing a transceiver connected to the vehicle data port using a wired pass thru hardware interface box.

The transceiver 20 may be any of a number of items, such as a specialized standalone transceiver, a laptop computer with specialized software and communications protocols loaded thereon, a specialized OBD-II dongle, or other specialized appliance. As depicted in FIGS. 1 and 2, the transceiver 20 may have a wired communications cable 24 attached thereto, which communications cable 24 may then connect to a computing device 22. The pass-thru interface 14 and the wireless pass-thru interface 28 may be any of those known in the art, such as those incorporating the ELM327 chip-set or J2534 compatible devices. The wireless communication can use any of those available, including Bluetooth, 802.11 (WiFi), RF, or other wireless protocols known in the art.

As depicted in FIG. 1, the present system permits several independent user computing devices 22 concurrently to communicate with the vehicle 10 through the data port 12 using a variety of individual independent computing devices 22. The transceiver 20 communicates with each of the independent computing devices 22 using software and communications protocols. This communication may be wireless or may pass over wires such as the communications cable 24. For example, in FIG. 1, one user 30a communicates through the cable 24, whereas the other users 30b and 30c communicate wirelessly. The communications between the computing devices 22 and the transceiver 20 may be bidirectional, and thus each computing device 22 may concurrently request and acquire any of the disparate types of vehicle diagnostic data available through the data port 12 from the vehicle 10 in real time, that is, as that data is generated and made available by the vehicle 10.

The transceiver 20 is typically designed to permit connection and disconnection from the vehicle data port 12. The communications protocol contained in the programming of the transceiver 20 distributes the vehicle data to the various user computing devices 22. The transceiver 20 streams various types of vehicle data in real time to whichever of the independent computing devices 22 has requested such data.

The transceiver 20 may accept instructions or commands from each of the computing devices 22. These commands typically are requests for specific types of vehicle data, for example vehicle engine rpm, fuel level, temperature, or any of the other data or commands available from the vehicle data port 12. However, other commands may also be made, such as opening or closing the connection to the vehicle data port 12 or reading trouble code data or making requests for other data from the vehicle 10 or sending command codes, such as those that lock or unlock the torque converter or roll down a window or lock or unlock doors or honk the horn or test the headlights or actuate other vehicle systems.

The transceiver 20 passes those commands on to the vehicle data port 12. As the requested commands are performed or data is collected, the vehicle data port 12 passes that information to the transceiver 20, which in turn makes that information available to the computing devices 22 that requested that information. Computing devices 22 that have not requested certain information are typically not provided with that information, but may be provided with other requested information. Thus, each computing device 22 is typically only provided with the subset of information that the user 30 of that computing device 22 has requested. However, in other embodiments, the system may be configured to provide each user 30 or computing device 22 the entire set of data, including data or communications not specifically requested by that computing device 22.

The actual data transmission may be directed to the computing devices 22 in various ways. For example, in one embodiment, the transceiver 20 may identify the computing device 22 requesting a certain set of data, and when transmitting that data, the transceiver 20 may selectively direct that data to the specific computing device 22, such as by addressing the computing device 22 in the protocol. In another embodiment, the transceiver 20 may be configured to broadcast all of the data that has been requested by all of the connected computing devices 22, and the respective computing devices 22 would then handle the data based on its own set of filters and uses.

There may be various ways for a computing device 22 to connect to the transceiver 20. In one embodiment, a specialized protocol built on the TCP protocol (or another communications protocol such as UDP) effects the communication. The specialized protocol is designed to handle the communications specific to the system, such as establishing a connection between a computing device 22 and the transceiver 20 or specifying the types of communications data to be transmitted between the computing device 22 and the vehicle 10.

For example, a given computing device 22 may connect using the transceiver 20 (and, in some embodiments, the pass-thru interface 14 or 28) to the vehicle data port 12 and request certain data, such as engine RPM, temperature, and vehicle speed. The transceiver 20 prioritizes and sequences the requests from all the connected computing devices 22 so that it can maintain compliance with existing standardized vehicle data port protocols. The importance of this step is emphasized by the fact that certain existing vehicle data port protocols require that certain requests be handled in a specific manner, such as by requiring a wait time after receipt of one request and before accepting another request. Other existing vehicle protocols may close the connection if requests are not transmitted to the vehicle data port 12 properly. These sorts of conflicts may be difficult to avoid if the communications involve such prior systems as using a splitter (or Y) cable. Thus, the specialized protocol is designed to manage these sorts of conflicts.

In one embodiment, the transceiver 20 can accept concurrent connections from the plurality of computing devices 22 over TCP/IP sockets. The computing devices 22 are then able to connect to the transceiver 20 using TCP/IP from anywhere in the world, over both wired and wireless connections. In other embodiments, this is further enhanced to accept connections using other protocols such as Bluetooth, RS232, and USB.

In another embodiment, the transceiver 20 contains a built-in web server and can accept concurrent web connections from the plurality of computing devices 22 using web protocols such as HTTP/HTTPS. The computing devices 22 are then able to communicate one or more URIs to the transceiver 20 over the web connection. The transceiver 20 parses each URI and takes a predetermined action based on the nature and characteristics of that URI. In one embodiment, the transceiver 20 may convert web connections utilizing a specific predetermined URI (in this case, a "diagnostic URI") into a WebSocket capable of bidirectional communication of vehicle diagnostic data and other information (a "diagnostic WebSocket").

In one embodiment, the transceiver 20 containing a built-in web server may be connected to an existing network using a wired network cable (such as an Ethernet cable). In other embodiments, the transceiver 20 may contain a WiFi chip or some other wireless communications functionality and could create a standalone WiFi network whereby one or more computing devices 22 could join the standalone WiFi network, or the transceiver 20 could join a separate existing wireless network.

In one embodiment, the web-enabled transceiver 20 may host a diagnostic scan tool web app on its own built-in data storage medium accessible through its web server, which allows computing devices 22 to establish a web connection to the transceiver 20 web server and download the diagnostic scan tool web app as part of a web page. In this embodiment, a computing device 22 would establish a web connection to the transceiver 20 and communicate a predetermined URI (in this case, a "web app URI") to the transceiver 20. Upon recognizing the web app URI, the transceiver 20 would download the diagnostic web app to the computing device 22 over the web connection. This scenario allows for standalone vehicle diagnostics between the transceiver 20 and the computing device 22 without requiring any external servers or software app delivery systems.

In another embodiment, the diagnostic scan tool web app may be hosted on a server separate from and external to the transceiver 20 (such as a web page hosted on an external Internet server or other network server) or is delivered to the computing device 22 via a software app delivery system (or "app store"). In this embodiment, the computing device 22 accesses and loads the web app independently of the transceiver 20 and then makes diagnostic web connections to the transceiver 20.

In some embodiments, the web app supports simultaneous connections to multiple web-enabled transceivers 20 installed within or in electrical communication with one or more separate vehicles 10. In these embodiments, a single web app running on a computing device 22 actively watches for, and attempts to connect to, the transceivers 20 on a predetermined wireless network. If one or more vehicles 10 containing transceivers 20 approaches the predetermined wireless network, the web app running on the computing device 22 may then establish a web connection to one or more transceivers 20 and communicate diagnostic data bidirectionally with one or more vehicles 10.

In some embodiments, the transceiver 20 containing a built-in web server and the capability to create a standalone wireless network may be configured to listen for wireless communications sent by computing devices 22 on the wireless network, which wireless communications may or may not be intended for the transceiver 20. The transceiver 20 could analyze any wireless communications that are not intended for the transceiver 20 and the transceiver 20 could provide responses to those wireless communications in a predetermined way.

The transceiver 20 may be configured to monitor for wireless communications containing DNS requests and provide DNS responses. For example, a computing device 22 could join the standalone wireless network specific to a transceiver 20 wherein the computing device 22 transmits a DNS request on the wireless network for a DNS name such as "www.google.com". In this example, the transceiver 20 would provide a DNS response to that computing device 22 indicating that the requested DNS name belongs to the transceiver 20. After receiving the DNS response from the transceiver 20, any further computing device 22 wireless communications intended for the requested DNS name would actually be sent to the transceiver 20, which may then take further predetermined actions and processing based on those wireless communications.

The transceiver 20 may also monitor for wireless communications containing HTTP requests, in which case the transceiver 20 would provide HTTP responses. For example, if the transceiver 20 creates a standalone wireless network and detects wireless communications that are HTTP requests intended for "www.gmail.com", the transceiver 20 may provide HTTP responses that redirect those HTTP requests to web servers or predetermined web pages existing on the transceiver 20. In this example, a user 30 may join the standalone wireless network using a computing device 22 for vehicle diagnostic purposes and then open the web browser on the computing device 22. The web browser may be configured to automatically load a predetermined web page or home page upon being opened. The transceiver 20 would then be able to redirect the user's web browser automatically to a diagnostic web page so that the user 30 does not have to manually type in the URL.

Vehicle communications may be opened and closed by the transceiver 20 or by a request from a computing device 22 over the communications protocols. When a computing device 22 first establishes a connection to the transceiver 20, there is an authentication or handshake used to determine what protocol features are supported by both sides and a protocol version is agreed upon. This allows for backwards compatibility even when the computing device 22 supports newer or older protocol features than the transceiver 20 or other concurrently connected computing devices 22.

In one embodiment, the transceiver 20 is configured with a pre-defined set of supported vehicle data items that each computing device 22 may request from the vehicle 10. In this mode, the transceiver 20 may already be actively performing vehicle communications for these pre-defined data items, so that the data is ready once a computing device 22 requests it. In other embodiments, the individual computing devices 22 may configure the transceiver 20 with data items or other types of vehicle communications or commands that the transceiver 20 did not already have pre-defined. Thus, the system provides flexibility in use.

The specialized protocol allows for each computing device 22 to request, or poll, each vehicle data item at any time. The specialized protocol also allows for each computing device 22 to select a data set to be obtained using vehicle communications sent automatically or in an ongoing fashion by the transceiver 20 and streamed from the transceiver 20 to the computing devices 22 as soon as the vehicle data is available, without having to make an explicit request each time a new data sample is wanted. Thus, different computing devices 22 may be concurrently requesting, polling, or receiving different or even overlapping subsets of vehicle data from the transceiver 20. The transceiver 20 manages the communication link with the vehicle 10 and delivers configured data items to and from the computing devices 22.

As mentioned, the transceiver 20 maintains a queue of pending (and ongoing) communications requests from each computing device 22 and orders and sequences the vehicle communications so that timing requirements are properly met and collisions and other types of problems are avoided. The transceiver 20 may include a cache of vehicle communications or data available to computing devices 22 that do not necessarily need or want to make a new request for certain data. In such a case, the transceiver 20 requests uncached data from the vehicle data port 12 as needed by the users 30.

The transceiver 20 may also incorporate a system in which, during the processing, ordering, and sequencing of vehicle communications from the plurality of concurrently connected computing devices 22, the transceiver 20 may be configured to identify certain vehicle communications requests from one computing device 22 as duplicative or redundant of vehicle communications requests from another computing device 22. If such a duplicate or redundant vehicle communications request is found, the transceiver 20 may send a single communications request to the vehicle 10 and provide the response to more than one concurrently connected computing device 22. The transceiver 20 may include a graphical display, for example where a computer laptop has specialized software enabling it to act as a transceiver 20, so that a user 30 may use either that laptop acting in the capacity of a computing device 22 (as well as acting in the capacity of the transceiver 20) or another computing device 22 connected to that laptop, which again acts in the capacity of the transceiver 20.

According to one embodiment, the various computing devices 22 are configured to communicate with the transceiver 20 using a set of specialized protocols used by that transceiver 20. According to another embodiment, the computing devices 22 use the same protocols employed by the vehicle data port 12. In this embodiment, the transceiver 20 manages the communications with each of the respective computing devices 22, for example by identifying each communication as being associated with a specific computing device 22. The transceiver 20 receives the data requests from the respective computing devices 22, provides the data request to the vehicle data port 12 (either directly or through a pass-thru interface 14 or 28, depending on the specific system in use), and identifies the response (from the vehicle data port 12) to each communication with the respective computing device 22, so that the computing devices 22 each receive proper responses to the respective data requests made by that computing device 22. In effect, the transceiver 20 translates communications between the computing devices 22 and the vehicle data port 12, thereby emulating a single vehicle data port 12 from the "perspective" of each computing device 22, and emulating a single computing device 22 from the "perspective" of the vehicle data port 12. As a result, in this embodiment the computing devices 22 may communicate with the vehicle data port 12 through the transceiver 20 with minimal or no additional adaptation or configuration of the computing devices 22.

The connection between the transceiver 20 and a computing device 22 may also close. Closing may be the result of a choice to close, or the result of a dropped connection, or other factors. Upon close of a connection, the transceiver 20 re-prioritizes and re-sequences the vehicle communications, so that requests from the computing device 22 relating to the closed connection no longer consume available bandwidth and resources.

In some embodiments, the transceiver 20 may contain a user configurable limit to the number of simultaneous connections allowed from computing devices 22. In these embodiments, the transceiver 20 may accept new connections beyond the user configured limit, but when a new connection is accepted which exceeds the user configured limit the transceiver 20 takes a predetermined action such as closing or dropping an existing connection.

According to other embodiments, the transceiver 20 may include a built-in web server capable of accepting web connections from web apps, such as HTML and/or Javascript web apps, running on computing devices 22. In one embodiment, these web apps run within a web browser or web client on a computing device 22, typically using web pages displayed on the computing device 22 as is known in the art. In other embodiments the web apps are normal (or native) software applications capable of web connections and are written in a computer language such as C/C++ or Java or some other computer language as is known in the art. The web app would typically show vehicle telemetry and/or diagnostic communications data in a graphical gauge or other user interface as is known in the art. The display and user interface of the web app may thus involve any of those elements known to those of skill in the art.

In one embodiment, a web app running on a computing device 22 opens a web connection to the transceiver 20 and communicates a predetermined diagnostic URI over the web connection to the transceiver 20. The transceiver 20 recognizes the diagnostic URI and then converts the web connection into a diagnostic WebSocket. The web app may then send and receive vehicle communications over the diagnostic WebSocket through the transceiver 20. The web app may also send and receive non-vehicle communications over the diagnostic WebSocket, such as communications meant for configuration of the transceiver 20.

In some embodiments, the web app running on a computing device 22 may be capable of detecting dropped, closed, lost, or stalled connections (such as web connections or diagnostic WebSockets) and the web app may be configured to automatically reconnect to the transceiver 20 in these situations. In other embodiments, the web app may simply notify the user 30 of a dropped, closed, lost, or stalled connection and stop sending communications requests over the connection.

In some embodiments, the web app running on a computing device 22 establishes a diagnostic WebSocket with a transceiver 20 and sends Text Frame communications over the WebSocket to the transceiver 20. In other embodiments, the web app running on a computing device 22 communicates using Binary Frame communications over the WebSocket to the transceiver 20. In yet other embodiments, the web app running on a computing device 22 communicates using both Text Frame and Binary Frame communications as desired over the WebSocket to the transceiver 20.

In some embodiments, the transceiver 20 may be capable of both Text Frame and Binary Frame communications over the WebSocket. In other embodiments, the transceiver 20 may only be capable of either Text Frame communications or Binary Frame communications over the WebSocket, but not both. In these embodiments, the transceiver 20 analyzes communications requests received on the diagnostic WebSocket and classifies those communications requests as being Text Frames or Binary Frames. The transceiver 20 may be capable of both Text Frame and Binary Frame communications over the WebSocket but typically the transceiver 20 requires vehicle communications to be in a binary format. In such an embodiment, if the web app running on the computing device 22 was only capable of text formatted communications, then it would encode binary data as hex encoded text and the transceiver 20 would automatically convert any received text formatted communications into a binary format.

The transceiver 20 may be configured to process Text Frame communications in such a fashion as to identify certain Text Frame communications requests as being a human readable command (such as the text command "close" that, when sent, indicates that the connection to the vehicle 10 should be closed), a Hayes command (such as an ASCII encoded AT command intended for an ELM327 chip or a compatible chip that uses Hayes commands or other similar commands), or a text encoded binary command (such as ASCII or ASCII-HEX encoded commands; for example, each binary data byte may be encoded using two ASCII characters, one for each HEX digit). The transceiver 20 may then identify some human readable commands as vehicle communications requests and other human readable commands as not being vehicle communications requests. Similarly, some Hayes commands may be identified as vehicle communications requests and others as not being vehicle communications requests. Also, text encoded binary commands may be converted into binary data requests and processed to identify certain binary data requests as being vehicle communications requests and other requests as not being vehicle communications requests. Furthermore, some Binary Frame communications requests may be identified as being vehicle communications requests and others as not being vehicle communications requests.

In some embodiments, the transceiver 20 is configured to listen for commands that are not vehicle diagnostic communication requests. The transceiver 20 processes such commands in a predetermined way and provides a response over the diagnostic WebSocket. For example, a command that is not a vehicle command may be a configuration command for the transceiver 20 itself, such as a command to rename the wireless network created by the transceiver 20 or to configure other wireless network properties. Another example would be a command to change or configure the diagnostic URI used by the diagnostic WebSocket or to configure other diagnostic WebSocket properties.

In some embodiments, the transceiver 20 listens for commands that are vehicle diagnostic communication requests and processes, prioritizes and sequences those requests in compliance with the existing vehicle protocol requirements. The transceiver 20 sends the processed requests to the vehicle data port 12 so that the vehicle 10 may operate on the processed requests and pass back to the transceiver 20 any vehicle communications that incorporate data from the vehicle 10 and are responsive to the processed requests. Thereafter, the transceiver 20 selectively transmits the responsive vehicle communications to the computing devices 22 over the diagnostic WebSocket.

In typical embodiments, the web app would make a vehicle communications request over the diagnostic WebSocket and then block waiting for the vehicle communications response before processing the vehicle communications response data. In these embodiments, the web app may even be multithreaded and may send vehicle communications requests and block waiting for responses using the main thread or using a secondary thread or worker thread.

In other embodiments, the web app may be designed as a completely non-blocking app. In these embodiments, the web app could create a receive callback function to receive vehicle communications response data instead of blocking waiting for the response. The receive callback function may also process the data. In these embodiments, the web app may also set a timer callback function to be called in the event the vehicle communications responses are not received within a predetermined timeout period. The timer callback function may be configured and set each time a vehicle communications request is sent over the diagnostic WebSocket or it may be configured and set as a recurring timer upon initially opening the web app. The timer callback function may then take a predetermined action upon being called, such as resending the vehicle communications requests or closing the diagnostic WebSocket due to lack of response. In these embodiments, the receive callback function would typically cancel the timer callback function upon receiving a response or set a predetermined flag indicating that a response has been received.

The present method allows a plurality of concurrent users 30 to communicate with the vehicle 10 over the vehicle data port 12, all in real time. Thus, the present invention has several advantages over the prior art. It will be obvious to those of skill in the art that the invention described in this specification and depicted in the FIGURES may be modified to produce different embodiments of the present invention. Although embodiments of the invention have been illustrated and described, various modifications and changes may be made by those skilled in the art without departing from the spirit and scope of the invention.

The invention claimed is:

1. A web-enabled vehicle diagnostic system configured to be in electrical communication with a vehicle data port and configured to communicate with a computing device, the diagnostic system comprising:
   a transceiver that communicates with the vehicle data port, the transceiver including a built-in web server supporting WebSockets;
   the transceiver configured to accept at least one web connection from the computing device, the computing device communicating at least one Uniform Resource Identifier or URI to the transceiver over the accepted web connection;
   the transceiver further configured to check the at least one URI and to recognize one or more predetermined URIs as being diagnostic URIs;
   the transceiver further configured to convert any web connection using a recognized diagnostic URI from a web connection into a diagnostic WebSocket;
   the transceiver further configured to listen for predetermined commands on the diagnostic WebSocket that are not vehicle diagnostic communication requests, upon receipt of which the transceiver acts on those commands in a predetermined way and provides a response over the diagnostic WebSocket;
   the transceiver further configured to listen for vehicle diagnostic communication requests on the diagnostic WebSocket, upon receipt of which the transceiver processes, prioritizes and sequences the requests in compliance with predetermined vehicle protocol requirements;
   the transceiver configured to send processed requests to the vehicle data port so that the vehicle may operate on the processed requests and pass back to the transceiver any vehicle communications that incorporate data from the vehicle and are responsive to the processed requests; and
   selectively transmitting the responsive vehicle communications from the transceiver to the computing devices over the diagnostic WebSocket.

2. The system of claim 1 in which the transceiver contains a built-in data storage medium containing a web app and the transceiver is further configured:
   to check the at least one URI and to recognize predetermined URIs as being web app URIs; and
   to download a web app to the computing devices over the web connection upon recognizing a web app URI;
   and wherein the web app is configured to make one or more additional web connections to the transceiver and to communicate diagnostic URIs over the web connections.

3. The system of claim 1 in which the computing device accesses a web app from a server external to the transceiver or accesses a web app downloaded from an app delivery system, the accessed web app being configured to make one or more web connections to the transceiver and to communicate diagnostic URIs over the web connection.

4. The system of claim 1 in which the transceiver is further configured:
   to analyze communications requests received on the diagnostic WebSocket and to classify predetermined communications requests as being Text Frames or Binary Frames;
   to further process each Text Frame communications request in a predetermined way to identify certain predetermined Text Frame communications requests as being either a human readable command, a Hayes command, or a text encoded binary command;
   to further process any human readable commands in a predetermined way to identify certain human readable commands as being vehicle communications requests and other human readable commands as not being vehicle communications requests;
   to further process any Hayes commands in a predetermined way to identify certain Hayes commands as being vehicle communications requests and other Hayes commands as not being vehicle communications requests;
   to further process any text encoded binary commands and to convert the text encoded binary commands into binary data requests and to process the binary data requests in a predetermined way to identify certain binary data requests as being vehicle communications requests and other requests as not being vehicle communications requests;
   to process each Binary Frame communications request as a binary data request in a predetermined way to identify certain Binary Frame communications requests as being vehicle communications requests and other Binary Frame communications requests as not being vehicle communications requests;
   to listen for any commands or requests that are not vehicle diagnostic communication requests, upon receipt of which the transceiver acts on those commands or requests in a predetermined way and provides a response over the diagnostic WebSocket;
   to listen for any commands or requests that are vehicle diagnostic communication requests, upon receipt of which the transceiver processes, prioritizes and sequences the requests in compliance with predetermined vehicle protocol requirements;
   to send processed requests to the vehicle data port so that the vehicle may operate on the processed requests and pass back to the transceiver any vehicle communications that incorporate data from the vehicle and are responsive to the processed requests; and
   selectively to transmit the responsive vehicle communications from the transceiver to the computing devices over the diagnostic WebSocket.

5. The system of claim 1 in which the transceiver contains a user configurable setting specifying a limit to the number of concurrent diagnostic WebSocket connections allowed and is further configured such that when a new diagnostic WebSocket connection is made that exceeds the user configured limit, the transceiver automatically drops or doses an existing diagnostic WebSocket connection.

6. The system of claim 1 in which the transceiver is further configured to allow connection and disconnection from the vehicle data port.

7. The system of claim 1 in which the transceiver is provided as original equipment in the vehicle.

8. The system of claim 1 in which the transceiver is provided as an after-market item for the vehicle.

9. The system of claim 1 in which the electrical communication between the transceiver and the vehicle data port is a direct connection.

10. The system of claim 1 in which the electrical communication between the transceiver and the vehicle data port includes a pass-thru hardware interface.

11. The system of claim 1 in which the electrical communication between the transceiver and the vehicle data port is a wireless connection.

12. The system of claim 2 in which the transceiver contains built-in wireless communication functionality and is configured to create a standalone wireless network that the computing device may join, the transceiver is further configured to listen for wireless communications sent from any computing device that has joined the wireless network and to detect wireless communications meant for devices other than the transceiver and wherein the transceiver responds to the detected communications in a predetermined manner.

13. The system of claim 2 in which the web app is configured to make web connections to more than one separate transceiver simultaneously and to communicate diagnostic URIs over the web connections.

14. The system of claim 12 in wherein the transceiver response to the detected communications comprises redirection to a predetermined web page.

15. The system of claim 3 in which the web app is configured to make web connections to more than one separate transceiver simultaneously and to communicate diagnostic URIs over the web connections.

16. A method of enabling communications between at least one computing device containing a web-enabled diagnostic app and a transceiver that includes a built-in web server that supports WebSockets, the method comprising:
creating one or more web connections using the web-enabled diagnostic app and the transceiver while the transceiver is in electrical communication with a vehicle data port;
communicating, via the web-enabled diagnostic app, predetermined Uniform Resource Identifiers or URIs over the web connections to the transceiver wherein some predetermined URIs are diagnostic URIs that cause any web connection containing a diagnostic URI to be converted into a diagnostic WebSocket capable of bidirectional vehicle diagnostic communication with each computing device;
sending at least one of predetermined commands and predetermined vehicle diagnostic communications to the transceiver over the diagnostic WebSocket; and
receiving responses to the at least one of predetermined commands and predetermined vehicle diagnostic communications from the transceiver over the diagnostic WebSocket.

17. The method of claim 16 further comprising:
sending a communications request over the diagnostic WebSocket using the web-enabled diagnostic app before or after a timer initiates a predetermined timeout period, the expiration of the timeout period causing a call to a predetermined timeout callback function inside the web-enabled diagnostic app, the timeout callback function configured to take a predetermined timeout action in the event that communications responses have not been received within the predetermined timeout period;
employing a receive callback function to receive vehicle and other communications data from the transceiver on the diagnostic WebSocket, the receive callback function configured:
to be called when communications responses are received from the transceiver on the diagnostic WebSocket;
to process the communications responses in a predetermined way; and
to cancel the timer when communications responses are received by the receive callback function or to notify the timeout callback function that communications responses have been received.

18. The method of claim 16 in which the web-enabled diagnostic app is further configured to automatically reconnect the web connection or diagnostic WebSocket in the event that the web connection or diagnostic WebSocket has been dropped, lost, closed, or stalled.

19. The method of claim 17 in which the predetermined timeout action is the action of resending the communications request over the diagnostic WebSocket until a predetermined retransmission limit is reached.

20. The method of claim 17 in which the predetermined timeout action is the action of dropping or closing the diagnostic WebSocket connection.

* * * * *